Patented June 30, 1936

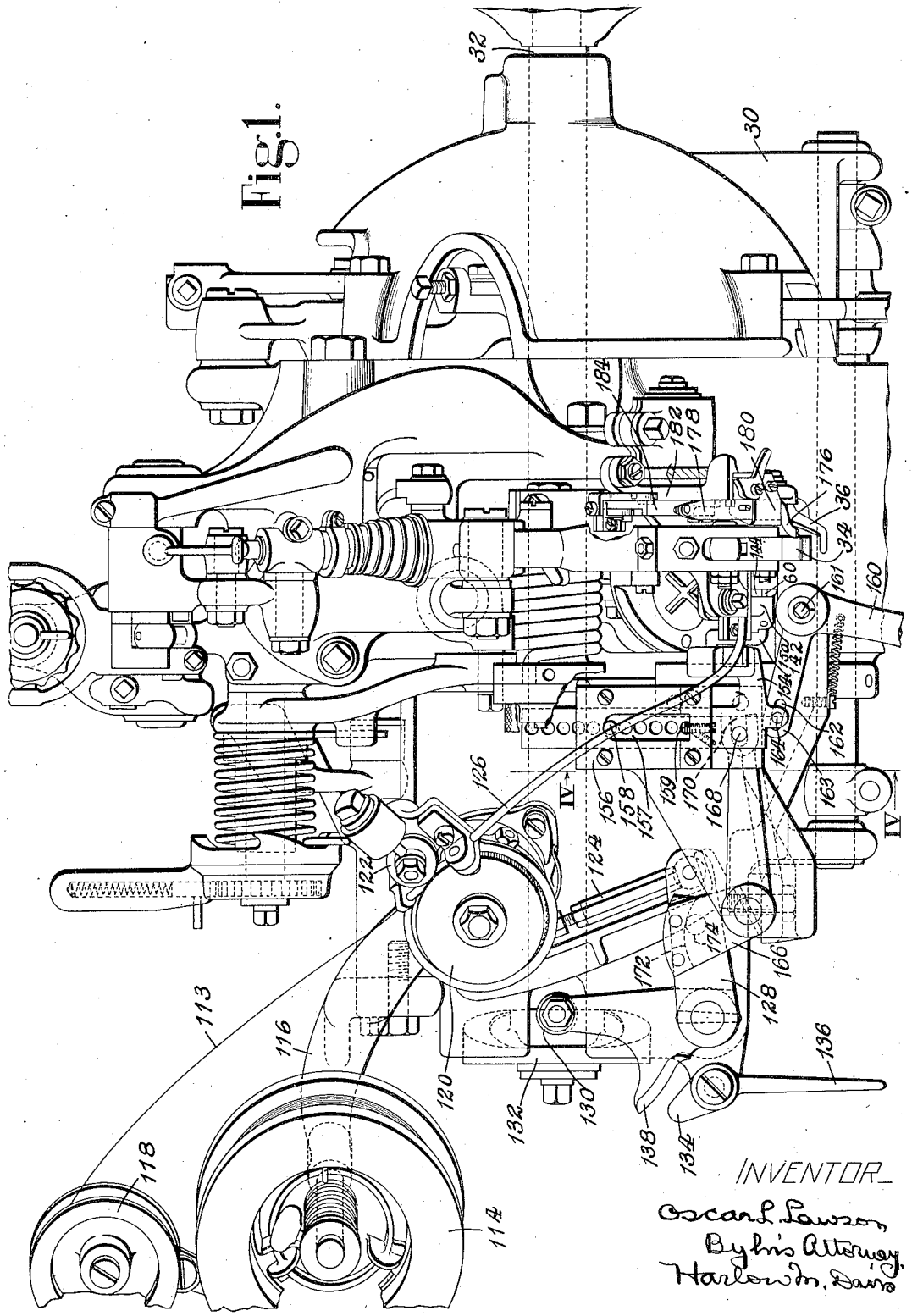

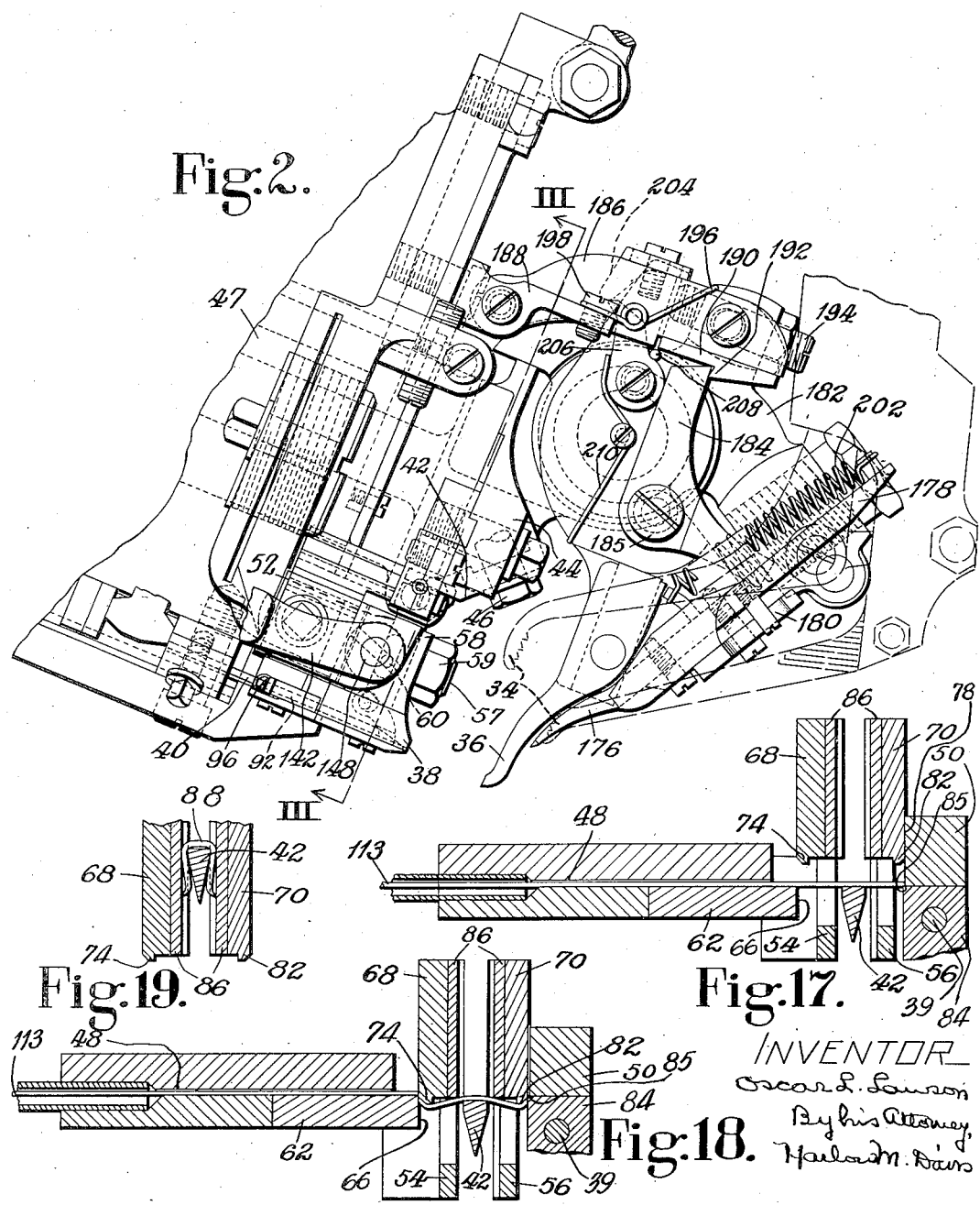

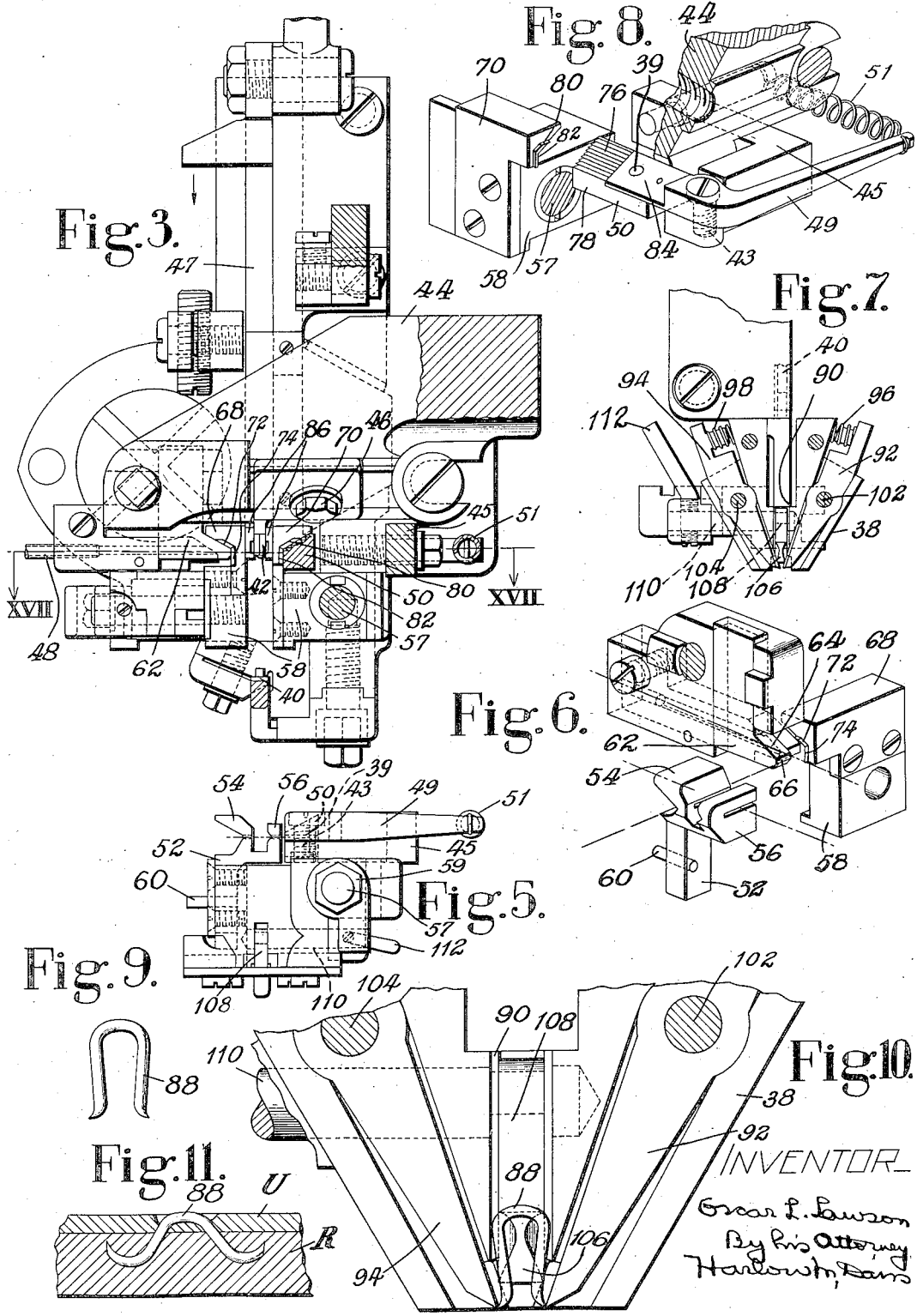

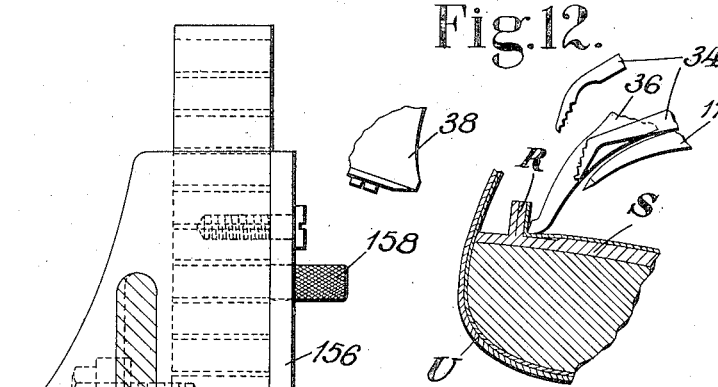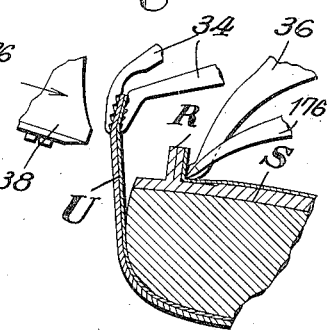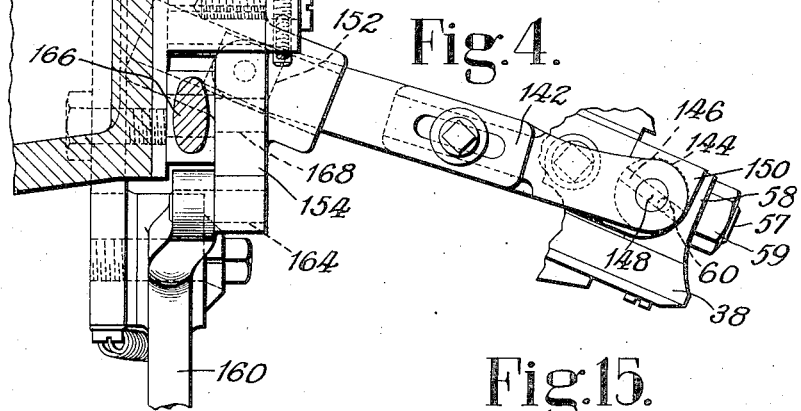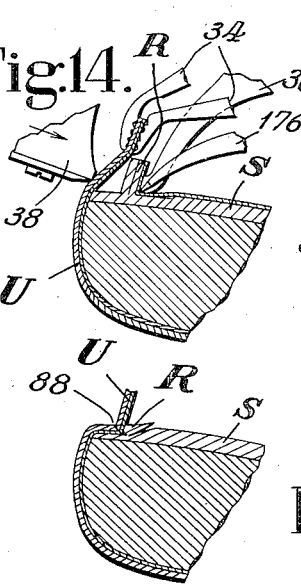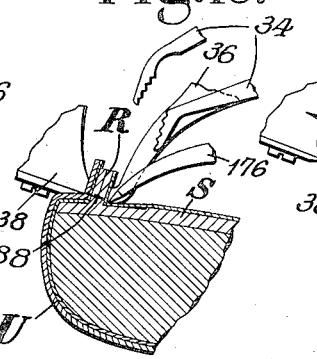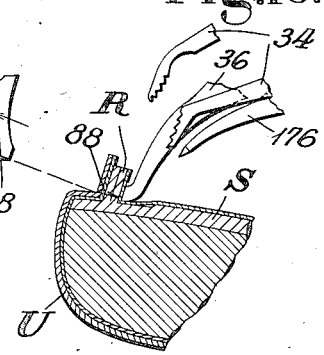

2,045,714

UNITED STATES PATENT OFFICE 2,045,714

MACHINE FOR USE IN THE MANUFACTURE OF SHOES

Oscar L. Lawson, Lynn, Mass., assignor to United Shoe Machinery Corporation, Paterson, N. J., a corporation of New Jersey Application May 11, 1933, Serial No. 670,525

27 Claims. (Cl. 12—2)

The present invention relates to the manufacture of shoes and in some of its novel aspects has more particular relation to the fastening of an upper to a sole or insole (hereinafter frequently referred to generically as the sole). The invention is herein illustrated in its application to the manufacture of welt shoes, but it is to be understood that the invention is not thus limited, but is applicable to the manufacture of shoes of other kinds including turn shoes.

In the manufacture of certain types of shoes, for example, welt shoes, the upper is frequently secured in lasted relation to a projection or lip on an insole on a last by the use of fastenings, such as staples. The shoe upper is placed under considerable strain as it is pulled heightwise of the last by the lasting instrumentalities, and to obtain a properly made shoe it is necessary that the upper be fastened in such manner as to hold it effectively in tensioned conditions. Fastenings in the form of fine wire staples are satisfactory for this purpose, since ordinarily they do not interfere in any way with subsequent operations nor are they objectionable in the finished shoe. Under some conditions, however, due either to the fault of the operator in positioning the shoe when the staples are driven, or to the quality of the insole material used, the strain of the upper on the lip may distort the lip when the lasting instrumentalities release the upper after the insertion of a staple, so that the tension of the upper becomes somewhat relaxed and the lip is not in the best position for later operations.

An object of the invention, among others, is to provide an improved machine by the use of which the above-mentioned condition will be avoided. For the purpose in view the construction shown comprises means for conforming an upper to the shape of a last and for laying the margin of the upper over a sole on the last, means for forming a staple having laterally deflected ends on its legs to cause the legs of the staple to follow diverging curved paths in the work, and means for driving the staple through the upper and into the sole to hold the upper in lasted relation to the sole. More particularly, the staple forming means, as illustrated herein, comprises bending and severing means arranged first to bend the staple material and then to sever the material adjacent to the bend, and means for forming from the severed length of material a staple having deflected ends arranged to follow curved paths in the work as the staple is driven. It will be evident that such a mechanism forms a staple which anchors itself within the work without the use of a clenching anvil and, consequently, the staple can be driven closer to the base of a lip on the sole than would be possible when an anvil is used. It will thus be apparent that when the lip is formed of unusually flexible or yielding material any substantial distortion of the lip and consequent loosening of the upper will be avoided. Such upper fastening means is also especially useful for fastening the upper to a shoulder on the sole, instead of to a lip, in making shoes having shouldered soles.

Machines that operate to last shoes progressively as herein illustrated are each commonly provided with a shoe rest against which the operator holds the bottom of the shoe and which supports the shoe against the pull on the upper heightwise of the last, this shoe rest also assisting by its engagement with the sole or insole in holding the shoe against lateral displacement by the force applied in laying the margin of the upper inwardly into position to be fastened. In operating on a shoe that has an insole provided with a lip the shoe is normally held against displacement by engagement of the shoe rest with the lip of the insole and in part also by such friction as there is between the insole and the lower end face of the shoe rest due to the upward pressure of the shoe against the shoe rest as the operator holds and supports the shoe. It is a further object of the invention to provide improved means to cooperate with the shoe rest in holding a shoe against lateral displacement. For the purpose in view the construction shown comprises novel means which is movable automatically into and out of position to cooperate with the shoe rest in holding the shoe against lateral displacement by the force applied in operating upon the upper. More particularly, this means comprises a member formed to penetrate the insole and controlled by the overlaying means, so that it is moved into engagement with the bottom of the shoe in time relation to each upper-pulling and overlaying operation and is moved thereafter out of engagement with the shoe to permit the shoe to be advanced to the next lasting position.

The invention in its various novel aspects will now be more particularly described by reference to the accompanying drawings and thereafter, pointed out in the claims.

In the drawings,

Fig. 1 is a front view of the head of a machine embodying the present invention;

Fig. 2 is a view in side elevation of parts including the fastening forming and inserting mechanism on an enlarged scale;

Fig. 3 is a view in front elevation, partly in section, of the fastening severing and forming instrumentalities;

Fig. 4 is a view partly in section taken along the line IV—IV of Fig. 1, showing the mechanism for controlling the length of the fastenings;

Fig. 5 is a view in front elevation of the mechanism for guiding fastening material to the bending and severing mechanism;

Fig. 6 is an exploded view showing the relation of the guide for the fastening material to the mechanism for bending and severing the material;

Fig. 7 is a bottom view of the nozzle of the machine showing the fingers for deflecting the legs of the staple;

Fig. 8 is an exploded view of the mechanism for bending the free end of the fastening material;

Fig. 9 is a view on an enlarged scale of a staple formed by this machine;

Fig. 10 is a detail view similar to Fig. 7, showing the means for deflecting the legs of the staple on an enlarged scale;

Fig. 11 is a view in section taken through the upper and insole of a shoe, illustrating the manner in which the staple is anchored in the work;

Figs. 12 to 16, inclusive, are views showing successive positions in the cycle of operations of the upper pulling fastening inserting and work positioning instrumentalities in operating on a shoe having a lipped insole;

Fig. 17 is a view in section taken along the line XVII—XVII of Fig. 3, showing the location of the fastening, bending and severing mechanism in inoperative position;

Fig. 18 is a view similar to Fig. 17 showing the positions of the parts at the conclusion of the bending and severing operations;

Fig. 19 is a view showing the location of the parts at the conclusion of the staple forming operation; and Fig. 20 is a view in section of a shoe having its upper secured to a shouldered insole by staples formed and driven by the present machine.

The present invention is disclosed as embodied in a machine of the type illustrated in United States Letters Patent No. 1,796,451, granted March 17, 1931, upon an application filed in the name of George Goddu. The parts of the machine disclosed in said Letters Patent will not be described in detail except as is necessary for a complete understanding of the present invention. Reference may be had to the above-mentioned Letters Patent for a more detailed description of the construction and operation of the entire machine.

The machine is provided with a head 30 which is adjustably mounted on a hollow column within which is mounted the power shaft of the machine. The power shaft is connected by bevel gears to a horizontal cam shaft 32 upon which are the cams for operating lasting pincers 34 and for operating the staple forming and driving instrumentalities. The cams for operating the lasting pincers 34 may, at the will of the operator, be held stationary during operative movement of the cam shaft 32 in order to permit the machine to be used solely as a stapling machine without pulling the upper.

The various clutches and treadle mechanisms for controlling the operation of the machine are substantially the same as those disclosed in Letters Patent No. 1,796,451 (above referred to) to which reference may be had. The shaft 32 is prevented from coming to a stop at any point except at the end of the cycle of operations.

The present machine is provided with a guide member or shoe rest 36 which is adapted to engage the outer or bottom face of an insole and the inside face of a lip or rib on the insole to position the shoe properly relatively to the fastening inserting means and to the lasting pincers 34. The shoe rest 36 is mounted at the front of the machine and may be yieldingly mounted if so desired. The pincers or gripper 34 are operated to pull the upper heightwise of the last, as shown in Fig. 13, and then inwardly over the margin or feather of the insole, as shown in Fig. 14. An overlaying member or pressing member 38 (Fig. 2) comprising a staple guiding nozzle is moved in a direction inclined to the bottom face of the insole to lay the margin of the upper over the feather of the insole and against the lip and while the upper is thus held clamped against the lip a staple is driven by a driver 40 to fasten the upper to the lip at a point adjacent to the apex of the angle formed by the feather of the insole and the lip, the legs of the staple being deflected by the work, as hereinafter more particularly described, in curved paths such as to anchor them in the insole without penetrating the inner face of the lip or the face of the insole in engagement with the last.

In order to provide ample room for manipulation of the shoe and for the operation of the gripper the staple forming mechanism (which will hereinafter be described in detail) is so constructed and arranged as to form a staple in a location out of alinement with the staple driver 40 and above the path of movement of the driver. The machine is provided with means for transferring the staple downwardly into alinement with the driver between staple forming and driving operations. For forming the staple there is provided an inside former 42 (Fig. 2) supported on a stationary bracket 44 secured to the head of the machine by a cap screw 46. The rest of the staple forming mechanism and the means for transferring the staple from forming position to driving position, with the exception of the wire cutting means, are carried by a slide 47 to which the staple guiding nozzle 38 is secured by a stud 57 and nut 59, this slide being mounted for reciprocating movement in an inclined guideway in the head of the machine. The slide is moved along its guideway through connections to a cam as clearly shown and described in the Letters Patent above referred to.

Secured to the bracket 44 in fixed relation to the inside former 42 is a wire guiding passage 48 (Fig. 3) to which wire is fed by means hereinafter described, the wire being advanced until its free end engages an abutment or stop 50 secured by a screw 39 to a member 84 pivotally mounted at 43 (Fig. 8) on a bracket 45 secured to the head of the machine. The member 84 is provided with a laterally extending arm 49 to which there is connected a spring 51 which acts yieldingly to hold the abutment 50 in engagement with a member 70 (hereinafter more particularly referred to), the abutment being so mounted as to prevent bending of the wire when the wire strikes the abutment. The wire is fed forwardly over a guiding member 52 (Figs. 2, 5 and 6) which is mounted on the forward end of the movable slide 47 which, as hereinbefore stated, carries the member 38 for laying the upper inwardly over the insole and for guiding the staple as it is driven. The guiding member 52 is provided with upwardly extending portions 54, 56 which are provided with rearwardly extending slots which receive the wire and which position the wire in proper relation to wire bending and cutting means. The position of the slots in the upstanding portions 54, 56 relatively to the bending and cutting or severing means determines the extent of feeding movement of the feeding means and, consequently, the length of wire which is to be severed through connections which will later be described. The member 52 slides in a guideway formed in an upward extension 58 of the nozzle 38 (Fig. 2) and is provided with a pin 60 to which is connected mechanism for maintaining the member 52 in adjusted position as will later be fully described. The upwardly extending portions 54, 56 are spaced apart to receive the inside former 42 and the portions 54, 56 are shaped to prevent interference with stationary parts of the wire cutting and staple forming mechanism.

Mounted on the stationary bracket 44 in front of the wire passage 48 is a wire cutting knife 62 which is provided with a cutting edge 64 (Figs. 3 and 6) inclined at a substantial angle to the vertical and with a substantially vertical cutting edge 66 which operates when very short staples are to be made. The member 84, associated with the abutment 50, and the stationary knife 62 co-operate with the member 70 and a member 68 (Fig. 3) to deflect the ends of a length of wire presented thereto and to sever it in a manner which will later be made apparent. The cutting edge 64 is inclined in order that different portions of the edge will be effective depending upon the length of the wire to be cut. As above stated, the length of the wire severed by these co-operating members is dependent upon the position of the slots in the upstanding portions 54, 56 of the member 52 relatively to the cutting edges 64, 66 of the knife 62 and to portions of the stop or abutment 50, it being necessary that the wire feeding mechanism be properly adjusted to feed the proper length of wire. To this end connections between the member 52 and the wire feeding mechanism are provided as will be later described.

The members 68 and 70, above referred to, are mounted on the upward extension 58 of the nozzle 38 rearwardly of the member 52 and prior to the wire severing operation are located just rearwardly of the stationary cutting knife 62, as best shown in Fig. 17. The member 68 is provided with cutting edges 72, 74 which co-operate with the cutting edges 64, 66, respectively, of the knife 62 to sever a length of wire which subsequently is formed into a staple. These co-operating cutting edges are so formed that the wire is first bent and then cut to form a deflected point or end on that end of the severed length of wire. The other end of the wire is provided with a deflected point by the members 84 and 70.

The abutment or stop 50 is provided with a stepped or serrated portion 76 (Fig. 8) the inclination of which is substantially the same as the cutting edge 64 of the wire cutter 62 but it is inclined in the opposite direction. The abutment 50 is also provided with a substantially vertical portion 78. The end of the wire is fed through the slots in the members 54, 56 and against either the stepped portion 76 or the vertical portion 78. The member 70 is provided with an inclined portion 80 and a vertical portion 82 co-operating with the portions 76, 78 of the abutment 50. The member 84 is located forwardly of the stepped portion 76 and the vertical portion 78 of the abutment 50 and has an upper face which is inclined in the same direction as and is flush with the top of the stepped portion 76, and also a shoulder 85 (Figs. 17 and 18) extending laterally of the vertical portion 78. When the member 70 moves forwardly the end of the wire is caught between the member 84 and either the portion 80 or the portion 82 of the member 70 in such a manner that the end of the wire is bent toward the same side of the wire as the bent or deflected point of the other end of the severed length of wire. As the end of the wire is bent or deflected the member 84 yields more or less against the resistance of the spring 51 (Fig. 18) in response to pressure of the wire against it to permit the end of the wire to pass. This operation takes place at the same time that the other end of the length of wire from which the staple is to be formed is bent. Fig. 18 clearly illustrates the positions of the various parts of the wire cutting and deflecting mechanism at the conclusion of the bending and severing operations.

The operation of the wire cutting and deflecting or bending mechanism as a unit will now be briefly described. The wire is fed through the wire guiding passage 48, through the slots in the upstanding portions 54, 56 of the wire guiding member 52 and against the abutment 50. The slide 47 which carries the cutting and deflecting members 68 and 70 then moves in a direction toward the operator to bend the wire to form deflected ends or points thereon and then cuts a piece of wire from the length of wire adjacent to the bend made in the wire by the members 62, 68. Further movement of the slide 47 causes an outside former 86 carried thereby to engage the piece of wire and bend or shape it about the inside former 42. A staple 88 is thus formed with the ends of the staple legs deflected outwardly away from each other in the general plane of the staple (Fig. 19), and because the outwardly deflected ends are engaged by the sides of the outside former in the forward movement of the latter, the staple legs as a whole are bent far enough to converge toward their ends. The staple 88 at this time is in a position to be transferred to the driver passage in the nozzle 38. The staple 88, after it has been formed, is moved downwardly into the driver passage in the nozzle 38 by downward movement of the outside former 86 in the manner described in Letters Patent No. 1,796,451 hereinbefore referred to.

At the same time that the staple 88 is being formed the nozzle 38, secured to the slide 47, is being moved toward the shoe which is being lasted, the upper U of the shoe having been gripped and pulled by the lasting pincers 34. The lasting pincers are first given an upward movement to tension the upper (as shown in Fig. 13) and are then moved inwardly, as in Fig. 14, to draw the upper over the insole S, whereupon the nozzle 38 engages the upper to lay the upper over the margin of the insole. It is to be noted that the nozzle 38 presses the upper closely into the angle between the lip R of the insole and the feather or margin of the insole, and guides the staple 88 in such a path that it is driven very close to the base of the lip R. During these operations the shoe rest 36 engages the bottom face of the insole and the inner face of the lip R, close to the base of the lip, thereby resisting the pull of the pincers 34 and acting as a gage for the work. The operation of the lasting pincers 34 and the staple inserting instrumentalities described just above is substantially the same as in the Letters Patent abovementioned, to which reference may be had for a more detailed description of the construction and operation of these parts.

The staple 88 is transferred from the position in which it was formed to the driver passage at the end of the movement of the nozzle 38 and prior to the operation of the driver. Mechanism contained within the nozzle 38 for determining the depth to which the staple 88 is to be driven into the work will now be described. The nozzle 38 is provided with a driver passage 90 which receives the staple 88 and acts as a guide for the driver 40. As best shown in Figs. 7 and 10, which are bottom views of the nozzle with the cover removed, a pair of fingers 92, 94 located in recesses in the bottom of the nozzle 38 extend into the driver passage 90. The forward ends of the fingers 92, 94 are urged toward each other by springs 96, 98 which bear against the nozzle 38 at opposite sides thereof and against the rear ends of the fingers. As illustrated, the fingers 92, 94 are pivoted to the nozzle 38 at 102 and 104, respectively. The forward ends of the fingers are spaced apart by a block 106 which is located between the fingers 92, 94 and above the driver passage in the nozzle 38. This block is arranged to be moved toward and away from the end of the nozzle, thereby varying the distance between the ends of the fingers. The block 106 is secured to one end of a sliding bar 108 which is connected at its other end to an eccentric on a shaft 110 provided at its outer end with a handle 112 by means of which the shaft 110 may be turned to move the block 106 toward or away from the end of the nozzle 38. The fingers 92, 94 by engagement with the ends of the staple legs act to bend or deflect them farther toward each other to determine the distance between the ends of the legs of the staple at the time when they enter the work. It will be understood that in the driving operation the fingers 92, 94 yield to permit the wider portion of the staple and the driver to pass.

As above stated, the deflection of the legs of the staple 88 by the fingers 92, 94 determines the depth to which the staple is to be driven. For example, if the stock through which the staple is to be driven be relatively thin the legs of the staple will be deflected toward each other only a very small distance, but if the staple is to be driven into relatively thick stock the legs will be deflected toward each other to a substantially greater degree. This is because of the fact that the nearer the bent or deflected ends of the legs of the staple are brought together the greater will be the angle between the deflected ends of the staple and the surface of the work into which they are to be driven and, accordingly, the deeper the staple will be driven into the stock and, conversely, the greater the distance between the bent or deflected ends of the staple the less distance the staple will penetrate into the work. It is desirable that the fingers 92, 94 be adjusted to deflect the legs of the staple so that the ends of the legs will not penetrate the entire thickness of the work. As shown most clearly in Fig. 11, the ends of the staple legs are deflected by the work in such directions that the staple legs are turned outwardly away from each other and away from the crossbar of the staple and follow curved paths in the work located substantially in the general plane of the staple.

When the nozzle 38 completes its movement toward the shoe to force the marginal portion of the upper closely into the angle formed by the feather of the insole and the lip as shown in Fig. 15, the driver 40 is thrust forwardly under the influence of a spring to drive the staple into the work. The ends of the staple legs strike the work at an angle and are deflected outwardly, as above described. The lasting pincers 34 in the meantime have released the upper and have returned to their original position. The nozzle or overlaying member 38 is then retracted and the parts of the machine are in position to begin another cycle of operations.

Although the invention is illustrated as embodied in a machine particularly adapted to attach uppers to a lip or projection on an insole, it is apparent that the machine may be used to secure uppers to insoles of other types, it being desirable in some cases that the fastening should not penetrate through the sole. Referring now to Figs. 12 to 16, inclusive, it will be noted that the staple 88 is driven into the lip or projection on the insole very close to the base of the lip and, in fact, the staple is anchored in the lip adjacent to the body of the insole without penetrating through the lip. The staples being thus driven into the lip or projection adjacent to the body of the insole act to hold the overlaid margin of the upper flat upon the feather of the insole without substantially any relaxing of the lasting strain or distortion of the lip or projection on the insole after the lasting instrumentalities have been removed. The desired angle between the overlaid margin of the upper and the lip of the insole is thus maintained, thereby insuring the best results from the succeeding operations to be performed upon the shoe. In operating upon shoes having shouldered insoles of the type shown in Fig. 20, the anchoring of the staple 88 in the body portion of the insole in the manner described above produces best results. In addition to the fact that the staples are driven in such locations as to prevent distortion of the channel flap, the channel flap lies against the insole and produces a smooth bottom by reason of the absence of any portion or portions of the staples in the inside channel of the insole. Substantially the same advantages apply to the manufacture of turn shoes where the shoe is lasted with the upper wrong side out and then after being stitched is turned right side out. The channeled surface of the sole then becomes the inside tread surface which is relatively smooth and does not require the use of a filler.

The machine is provided with mechanism for feeding wire 113 to the wire cutting and staple forming mechanism. A reel 114 (Fig. 1) for carrying a coil of wire is supported on a bracket 116 secured to the head of the machine. The wire 113 is fed over an idler roll 118 and over a toothed feed roll 120, the wire being held against the toothed feed roll 120 by a roll 122 which is spring urged toward the roll 120. From the feed rolls the wire is fed through a tube 126 to the wire guiding passage 48. The feed roll 120 is operated by a pawl and ratchet mechanism through a link 124 and a bell crank lever 128 provided with a roll 130 engaged by a cam 132 on the cam shaft 32. In order to stop the feed of the wire, if desired, there is provided a finger 134 which may be turned by a handle 136 into position to engage a face 138 of the lever 128 and thus swing the lever 128 into such a position as to prevent it from being operated by the cam 132. The operation of the wire feeding mechanism thus far described is the same as in the Letters Patent above referred to.

In order to control the length of feed of the wire in accordance with the desired length of the staples, the machine is provided with mechanism which will now be described. As previously stated, the length of the staples is dependent upon the location of the slots in the upstanding portions 54, 56 of the member 52 relatively to the inclined portions 64, 76 of the wire cutting and deflecting mechanism. The member 52 is provided with the previously mentioned pin 60 which is connected to one end of an extensible link 142 (Figs. 2 and 4) through a disk 144 provided with a slot 146 into which the pin extends. The disk 144 is fast on one end of a shaft 148 which is mounted in a bearing formed in a block 150 secured to the nozzle 38. The other end of the shaft 148 is secured to one end of the link 142. The other end of the link 142 has pivoted thereto a block 152 which is slidably mounted in a guideway formed in a member 154 (Figs. 1 and 4). The member 154 is mounted to slide vertically in a guideway formed in the head of the machine, a plate 156 secured to the head of the machine being provided for holding the member 154 in the guideway. The slidable member 154 is provided with a vertically disposed series of holes in any one of which a pin 158 may be placed to limit the extent of movement of the member 154. The pin 158 by engagement with the plate 156 at the upper end of a slot 157 in the plate or by engagement with an adjustable screw 159 threaded into the lower end of the plate limits movement of the member 154 in either direction. The member 154 is moved vertically by a bell crank lever 160 pivoted to the head of the machine at 161, one end of the bell crank lever being provided with a slot 162 (Fig. 1) into which fits a pin 164 secured to a downwardly extending finger 163 formed as a part of the member 154. Thus movement of the bell crank lever 160 acts through the link 142 to rotate the shaft 148 and the disk 144. Rotation of the disk 144 acts through the pin and slot connection 60, 146 to raise or lower the wire-guiding member 52. It will be noted that the movement imparted to the pin 60 and to the member 52 is comparatively small, the greatest possible movement necessary being not more than one quarter of an inch. The movement could be greater if desired but this movement has been found to be sufficient for staples ordinarily used in shoemaking.

In addition to controlling the heightwise position of the member 52 movement of the bell crank lever 160 controls the length of feed of the wire through connections about to be described. The member 154 is connected to a bell crank lever 166 (Fig. 1) by a pin 168 which fits into a slot 170 formed in the arm of the bell crank lever 166. The other arm of the bell crank lever 166 is provided with a cam surface 172 which engages a cam roll 174 mounted on one arm of the bell crank lever 128. The cam surface 172 is so formed that swinging movement of the bell crank 166 in a counterclockwise direction as viewed in Fig. 1 will move the cam roll 130 on the bell crank lever 128 away from the cam 132 the bell crank 128 being urged in a direction to move the roll 174 toward the cam surface 172 by a spring (not shown). In other words, the position of the bell crank 166 determines the amount of lost motion between the cam roll 130 and the cam 132, thus determining the length of feed of the wire. It should be noted that through these connections just above described the length of feed of the wire and the position of the slots in the upstanding portions 54, 56 of the member 52 relatively to the cutting instrumentalities are adjusted at the same time through movement of the bell crank lever 160.

It will be evident that, as the upper is pulled inwardly over the insole by the gripper 34 and is additionally forced inwardly by the overlaying or pressing member 38 considerable force is applied to the shoe, tending to displace it laterally or in a direction transverse to its height. The shoe is normally held against displacement by engagement of the shoe rest 36 with the lip of the insole and in part also by such friction as there is between the insole and the lower end face of the shoe rest due to the upward pressure of the shoe against the shoe rest as the operator holds and supports the shoe. In order to insure against any possible danger under some conditions of distortion of the insole lip by too great a strain thereon or of such displacement of the shoe relatively to the shoe rest 36 as to result in the driving of a staple or staples in improper relation to the lip, as well as to relieve the operator of the necessity of exercising any special care in holding the shoe in such manner as to guard against these results, the machine herein shown is provided with a member 176 which is moved intermittently into and out of engagement with the insole at a location near the shoe rest 36 and has sharp prongs to penetrate the insole. The member 176 has an upwardly extending shank portion 178 (Fig. 2) which is slidingly mounted in a bracket 180 fast on one side of a holder 182 to which the shoe rest 36 is secured. The movements of the member 176 toward and from the shoe are effected by movement of the slide 47 carrying the overlaying member 38. The shank 178 is provided with a slot into which fits one end of one arm of a bell crank lever 184 which is pivoted at 185 to the holder or bracket 182. The other arm of the bell crank lever engages a latch 186 which is pivoted to a bracket 188 secured to the slide 47 which carries the overlaying member 38. A member 190 is adjustably secured to the latch 186 and carries a tooth or projection 192 which is engaged by the bell crank 184, an adjusting screw 194 serving to position the tooth 192 in proper relation to the end of the bell crank lever 184. The latch 186 is normally urged downwardly toward the bell crank lever 184 by a spring 196 secured to a forwardly extending portion of the bracket 188 by a cap screw 198. Thus, during return movement of the slide the latch 186 is held in engagement with the end of the bell crank lever 184 and raises the member 176 against the force of a coil spring 202. In order to disengage the latch 186 from the bell crank lever 184 at the beginning of the forward movement of the slide 47 the latch 186 is provided with a downwardly projecting member 204 which engages a pawl 206 mounted on the holder 182. The pawl 206 is normally held against a stop 208 by a spring 210 which permits the pawl to rotate by engagement of the member 204 therewith during return movement of the slide, thereby permitting the latch to remain in engagement with the bell crank lever 184. Upon outward movement of the slide 47, the pawl 206 is prevented from rotating by the stop 208, and the end of the projection 204 rides up over the end of the pawl 206, raising the latch 186 and permitting the member 176 to be moved into engagement with the insole by the coil spring 202.

In the use of the machine on a shoe having a lipped insole the operator presents the shoe with the lip of the insole in engagement with the work rest 36, starting usually at the forepart of the shoe adjacent to the previously pulled over toe portion of the upper, and then treadles the machine and holds the treadle depressed while moving the shoe lengthwise, thus lasting the shoe progressively from the toe end to the heel end. If the shoe is one having a shouldered insole, or if it is a turn shoe having a shouldered sole, the shoe is presented with the member 36 in the inside channel of such an insole or sole. In each cycle of operations the grippers are first moved downwardly and outwardly from the position shown in Fig. 12 to grip the upper; then upwardly to tension the upper and then inwardly over the feather or margin of the insole. During the cycle of operations a staple is formed and transferred into the driver passage in the nozzle or overlaying member 38 by mechanism previously described. The overlaying member 38 is moved forwardly from the position shown in Fig. 12 to the position shown in Fig. 15 to lay the upper against the lip and the margin or feather of the insole. When the overlaying member is in the position shown in Fig. 15, the staple in the driver passage is driven into the work as close as is possible to the base of the lip R and its legs are deflected to anchor it without penetrating entirely through the lip, as hereinbefore described. If the staple is driven into a shoulder of the sole or insole (Fig. 20) its legs are anchored in the body of the sole or insole by curvature thereof in opposite directions without entering the inside channel. At the beginning of the movement of the overlaying member 38 the member 176 is released through connections previously described and is forced into the surface of the insole adjacent to the inner face of the lip to assist in holding the shoe against lateral displacement during the lasting operation. After the staple has been inserted the member 176 is returned to the position shown in Fig. 12 through the retractive movement of the slide 47. The parts of the machine are now in position to begin another cycle of operations upon the shoe.

Novel features of the machine herein disclosed which relate to the staple-forming and driving means per se are claimed in a divisional application, Serial No. 742,333, filed on August 31, 1934; and the novel method of lasting and the product of the method are claimed in another divisional application, Serial No. 742,334, filed on August 31, 1934.

Having thus described my invention, what I claim as new and desire to secure by Letters Patent of the United States is:

1. A machine of the class described having, in combination, means for conforming an upper to the shape of a last and for laying the margin of the upper over a sole on the last, means for forming a fastening having ends deflected away from each other, and means for driving the fastening through the upper and into the sole to hold the upper in lasted relation to the sole.

2. A machine of the class described having, in combination, means for subjecting an unlasted portion of an upper to lasting strain to shape it over a last, means for fastening the upper in lasted position comprising mechanism for driving a staple through the upper and into the sole, and means for forming a staple having the ends of its legs deflected away from each other to cause the legs of the staple to follow diverging curved paths located substantially in the general plane of the staple to anchor it in the sole.

3. A machine of the class described having, in combination, means for subjecting an upper to lasting strain to shape it over a last and for positioning it in lasted relation to a sole on the last, and means for fastening the upper in lasted position comprising mechanism for driving through the upper and into the sole a staple having the ends of its legs diverging in such manner as to cause them to follow curved paths leading away from each other and located substantially in the general plane of the staple.

4. A machine of the class described having, in combination, means for subjecting an upper to lasting strain to shape it over a last and for positioning it in lasted relation to a sole on the last, and means for fastening the upper in lasted position comprising mechanism for driving a staple having the ends of its legs deflected away from each other through the upper and into the sole with its crossbar extending lengthwise of the edge of the sole.

5. A machine of the class described having, in combination, means for subjecting an upper to lasting strain to shape it over a last and for positioning it in lasted relation to a sole on the last, means for forming a staple having the ends of its legs bent outwardly in opposite directions, and means for driving the staple through the upper and into the sole with its crossbar extending lengthwise of the sole edge, to cause the legs to be forced apart lengthwise of the sole edge by the action of the shoe materials on their bent ends.

6. A machine of the class described having, in combination, means for conforming an upper to the shape of a last and for laying the margin of the upper over a sole on the last, means for forming staples of predetermined length having laterally deflected ends on their legs, and means for driving the staples through the upper and into the sole to cause the legs of the staples to be deflected in curved paths extending outwardly away from each other by the action of the sole on their deflected ends.

7. A machine of the class described having, in combination, means for subjecting a shoe upper to a lasting strain to shape the upper over a last and for positioning the upper in lasted relation to a sole on the last, means arranged to bend a length of wire and then to sever the wire adjacent to the bend, means for forming a staple from said severed length of wire with the ends of the staple legs diverging, and means for inserting the staple through the upper and into the sole with the legs of the staple following diverging paths in said upper and sole.

8. A machine of the class described having, in combination, means for subjecting a shoe upper to lasting strain to shape the upper over a last and for positioning the upper in lasted relation to a sole on the last, means arranged to bend a length of wire and then to sever the wire adjacent to the bend, means for forming a staple from said severed length of wire with the ends of the staple legs diverging, and means for inserting said staple through the upper and into a lip on said sole with the legs of the staple following diverging paths to anchor it in said lip without penetrating through said lip.

9. A machine of the class described having, in combination, means for subjecting a shoe upper to lasting strain to shape the upper over a last and for positioning it in lasted relation to a sole on the last, means for forming staples having converging legs diverging at their ends, and means for driving the staples through the upper and into the sole with the legs of the staples following diverging paths in said upper and sole.

10. A machine of the class described having, in combination, means for subjecting an upper to lasting strain to shape it over a last and for positioning it in lasted relation to a sole on the last, means for forming a staple of predetermined length having laterally deflected ends, and means for driving the staple through the upper and into the sole to cause the legs of the staple to follow curved paths extending outwardly away from each other substantially in the general plane of the staple.

11. In a machine of the class described, the combination with means for operating on a shoe successively in different locations along the edge of the shoe bottom to pull the upper over the shoe bottom, means for laying the marginal portion of the upper over the shoe bottom, and a shoe rest arranged to engage the bottom of a shoe presented by the operator in different positions for the different upper pulling and overlaying operations to hold the shoe against displacement heightwise and laterally by the force applied in these operations, of means movable automatically into and out of position to co-operate with said shoe rest in holding the shoe against lateral displacement by the force applied thereto in operating upon the upper in each location, and connections controlled by said overlaying means for moving the means co-operating with the shoe rest into and out of position through connections to said overlaying means.

12. In a machine of the class described, the combination with means for operating on a shoe successively in different locations along the edge of the shoe bottom to lay the marginal portion of the upper over the shoe bottom, and a shoe rest arranged to engage the bottom of a shoe presented by the operator in different positions for the different operations to hold the shoe against displacement heightwise and laterally by the force applied in these operations, of means movable automatically under control of said overlaying means into and out of position to co-operate with said shoe rest in holding the shoe against lateral displacement by the force applied thereto in operating on the upper in each location.

13. In a machine of the class described, the combination with means for operating on a shoe successively in different locations along the edge of the shoe bottom to lay the marginal portion of the upper over an insole having a lip thereon, and a shoe rest arranged to engage the lip of the insole of a shoe presented by the operator in different positions for the overlaying operation to position the shoe and hold it against displacement in a direction transverse to its height by force applied thereto in operating on the upper, of means controlled by said overlaying means and movable automatically into and out of position to co-operate with said shoe rest in holding the shoe against such displacement.

14. In a machine of the class described, the combination with means for pulling the upper of a shoe over a last successively in different locations along the edge of the shoe bottom, means movable toward the shoe bottom for laying the marginal portion of the upper inwardly over the shoe bottom in each location, and a shoe rest arranged to engage the bottom of a shoe presented by the operator in different positions for the different operations, of a device controlled by said overlaying means for engaging the shoe bottom to assist in holding it against displacement in a direction transverse to its height by the force applied thereto in operating on the upper in each location.

15. In a machine of the class described, the combination with means for laying a shoe upper over the margin of a sole on a last and for pressing the upper upon the sole successively in different locations along the margin of the shoe bottom, and a shoe rest arranged to engage the bottom of a shoe presented by the operator in different positions for the overlaying and pressing operations, of a device controlled by the overlaying and pressing means for penetrating the shoe bottom to assist in holding the shoe against displacement in a direction transverse to its height by the force applied thereto in operating on the upper in each location.

16. In a machine of the class described, the combination with a member constructed and arranged to move toward the bottom of a shoe to lay the marginal portion of the upper against the shoe bottom, and a shoe rest arranged to engage the bottom of a shoe presented by the operator in different positions for the overlaying operations, of a member for engaging the bottom of the shoe to assist in holding the shoe against displacement in a direction transverse to its height by the force applied thereto in operating upon the upper in each location, and means connecting said shoe bottom engaging member to the overlaying member for moving the shoe bottom engaging member into and out of operative position by movements of said overlaying member.

17. In a machine of the class described, the combination with means for operating on a shoe successively in different locations along the edge of the shoe bottom to pull the upper, a member arranged for movement toward the shoe bottom to lay the marginal portion of the upper over the shoe bottom, and a shoe rest arranged to engage the bottom of a shoe presented by the operator in different positions for the different upper pulling and overlaying operations to hold the shoe against displacement heightwise and laterally by the force applied in these operations, of a device for engaging the bottom of the shoe to co-operate with said shoe rest in holding the shoe against lateral displacement by the force applied thereto in operating on the upper in each location, and automatic means controlled by said overlaying member for moving the device into engagement with the bottom of the shoe in time relation to each upper pulling and overlaying operation and for moving it thereafter out of engagement with the shoe to permit the shoe to be advanced to the next operating position.

18. In a machine of the class described, the combination with a gripper for pulling the upper of a shoe over a last successively in different locations along the edge of the shoe bottom, means for operating the gripper to pull the upper, means for laying the marginal portion of the upper inwardly over the shoe bottom in each location, and a shoe rest arranged to engage the bottom of a shoe presented by the operator in different positions for the different operations, of means for engaging the bottom of the shoe to assist in holding the shoe against displacement in a direction transverse to its height by the force applied thereto in operating on the upper in each location, and a connection between said last-mentioned means and the overlaying member constructed and arranged to permit said last-mentioned means to be moved into engagement with the shoe as the overlaying member is moved toward the shoe and for thereafter moving said member out of engagement with the shoe after the upper pulling and overlaying operations have been completed upon the shoe in each location.

19. In a machine of the class described, the combination with a gripper for pulling the upper of a shoe over a last successively in different locations along the edge of the shoe bottom, means for operating the gripper to pull the upper, means for laying the marginal portion of the upper inwardly over the shoe bottom in each location, and a shoe rest arranged to engage the bottom of a shoe presented by the operator in different positions for the different operations, of means for engaging the bottom of the shoe to assist in holding the shoe against displacement in a direction transverse to its height by the force applied thereto in operating on the upper in each location, and connections between said means and the overlaying member for releasing said means to permit said means to be moved into engagement with the shoe as the overlaying member is moved toward the shoe, and a spring for moving said means into engagement with the shoe and for maintaining said means in engagement with the shoe until the overlaying member is returned to inoperative position.

20. In a machine of the class described, the combination with means for pulling an upper over a last successively in different locations along the edge of the shoe bottom, overlaying means movable toward the shoe to lay the marginal portion of the upper inwardly over a sole on the last in each location and movable away from the shoe after each overlaying operation, and a shoe rest arranged to engage the sole as the shoe is presented by the operator in different positions for the different operations, of a member formed to penetrate the sole to assist in holding the shoe against lateral displacement in each overlaying operation, a spring for moving said member into engagement with the sole, and a device arranged to be operated by movement of the overlaying means away from the shoe to withdraw said member from engagement with the sole.

21. In a machine of the class described, the combination with means for pulling an upper over a last successively in different locations along the edge of the shoe bottom, overlaying means movable toward the shoe to lay the marginal portion of the upper inwardly over a sole on the last in each location and movable away from the shoe after each overlaying operation, and a shoe rest arranged to engage the sole as the shoe is presented by the operator in different positions for the different operations, of a member formed to penetrate the sole to assist in holding the shoe against lateral displacement in each overlaying operation, a spring for moving said member into engagement with the sole, a bell crank lever for moving the member out of engagement with the sole against the resistance of said spring, and a device carried by said overlaying means for operating said bell crank lever to withdraw the member from the sole as the overlaying means is moved away from the shoe.

22. In a machine of the class described, the combination with means for pulling an upper over a last successively in different locations along the edge of the shoe bottom, overlaying means movable toward the shoe to lay the marginal portion of the upper inwardly over a sole on the last in each location and movable away from the shoe after each overlaying operation, and a shoe rest arranged to engage the sole as the shoe is presented by the operator in different positions for the different operations, of a member formed to penetrate the sole to assist in holding the shoe against lateral displacement in each overlaying operation, a spring for moving said member into engagement with the sole, a device movable with said overlaying means for withdrawing said member from engagement with the sole as the overlaying means is moved away from the sole, and automatic means to cause said device to release the member to the action of its spring upon movement of the overlaying means toward the shoe.

23. In a machine of the class described, the combination with means for pulling an upper over a last successively in different locations along the edge of the shoe bottom, overlaying means movable toward the shoe to lay the marginal portion of the upper inwardly over a sole on the last in each location and movable away from the shoe after each overlaying operation, and a shoe rest arranged to engage the sole as the shoe is presented by the operator in different positions for the different operations, of a member formed to penetrate the sole to assist in holding the shoe against lateral displacement in each overlaying operation, a spring for moving said member into engagement with the sole, mechanism comprising a latch movable with said overlaying means for withdrawing said member from engagement with the sole as the overlaying means is moved away from the shoe, and a device for operating said latch to release the member to the action of its spring upon movement of the overlaying means toward the shoe.

24. A lasting machine having, in combination, means for pulling an upper over a last, and upper-fastening mechanism movable inwardly over the bottom of the last to lay the marginal portion of the upper over a sole and against a lip or shoulder on the sole, said upper-fastening mechanism comprising means for driving a staple through the upper and into the sole, and means for forming a staple having the ends of its legs deflected away from each other to cause the legs of the staple as they are driven to follow diverging curved paths to anchor them in the sole.

25. A lasting machine having, in combination, means for pulling an upper over a last having a sole thereon, and upper-fastening mechanism movable inwardly over the bottom of the last to lay the marginal portion of the upper over the sole and against a lip on the sole, said upper-fastening mechanism comprising means for driving a staple through the upper and into the lip in a location close to the apex of the angle formed by the lip and the margin of the sole and at an angle to the outer face of the sole, and means for forming a staple having the ends of its legs deflected in such manner as to cause them to follow paths curved in opposite directions to anchor them in the lip close to the body portion of the sole.

26. A lasting machine having, in combination, means for pulling an upper over a last having a sole thereon provided with a lip, and upper-fastening mechanism movable inwardly over the bottom of the last in a direction inclined toward its bottom face to force the marginal portion of the upper into the angle formed by the lip and the margin of the sole, said upper-fastening mechanism comprising means for driving a staple through the upper and into the lip with the crossbar of the staple extending lengthwise of the edge of the sole, and means for forming a staple having the ends of its legs deflected in opposite directions to cause the legs of the staple as they are driven to follow diverging curved paths located substantially in the general plane of the staple to anchor them in the lip.

27. A lasting machine having, in combination, means for pulling an upper over a last having a shouldered sole thereon, and upper-fastening means movable inwardly over the bottom of the last in a direction inclined toward its bottom face to force the marginal portion of the upper into the angle formed by the margin and the shoulder of the sole, said upper-fastening mechanism comprising means for driving a staple through the upper and into said shoulder, and means for forming a staple having the ends of its legs diverging from each other to cause the legs of the staple in the driving operation to be deflected by the work in curved paths leading away from each other to anchor them in the sole.

OSCAR L. LAWSON.